United States Patent
Pinter et al.

(10) Patent No.: US 6,457,023 B1
(45) Date of Patent: Sep. 24, 2002

(54) ESTIMATION OF OBJECT LIFETIME USING STATIC ANALYSIS

(75) Inventors: Shlomit Pinter, Haifa; Sara Porat, Ramat Yishay, both of (IL)

(73) Assignee: International Business Machines Corporation, Armonk, NY (US)

( * ) Notice: Subject to any disclaimer, the term of this patent is extended or adjusted under 35 U.S.C. 154(b) by 75 days.

(21) Appl. No.: 09/751,566

(22) Filed: Dec. 28, 2000

(51) Int. Cl.$^7$ .............................................. G06F 17/30
(52) U.S. Cl. ...................................................... 707/206
(58) Field of Search ........................ 707/206; 717/132, 717/156, 159, 8–9; 714/53

(56) References Cited

U.S. PATENT DOCUMENTS

| | | | | |
|---|---|---|---|---|
| 5,652,883 A | * | 7/1997 | Adcock | 707/206 |
| 5,787,447 A | * | 7/1998 | Smithline et al. | 707/206 |
| 5,900,001 A | * | 5/1999 | Wolczko et al. | 707/206 |
| 6,045,585 A | * | 4/2000 | Blainey | 717/8 |

OTHER PUBLICATIONS

Witawas Srisa–An Srisa–an Chia–Tien Dan Lo J Morris Chang discloses "a performance analysis of the active memory system", Dept. of Comput. Sci., Illinois Inst. of Technol., Chicago, IL, USA This paper appears in: Computer Design, 2001. ICCD 2001. Procee.*

P. Cheng et al., "Generational Stack Collection and Profile–Driven Pretenuring", PLDI 1998, pp. 162–173.

S. Dieckman, et al., "A Study of the Allocation Behavior of the SPECjvm98 Java Benchmarks", Proceeding of the 13$^{th}$ European Conference of Object Oriented Programming (E COOP, 1999), Lisbon, pp. 1–8, Jun. 1999.

Hind, Michael et al., "Interprocedural Pointer Alias Analysis", ACM Transactions on Programming Languages, vol. 21, No. 4, Jul. 1999, pp. 1–47.

Blanchet, B "Escape Analysis for Object Oriented Languages", Application to Java TM, OOPSLA '99, pp. 20–34.

J.D. Cohi, et al., "Escape Analysis for Java", OOPSLA '99, pp. 1–19.

J. Bogda, et al., "Removing Unnecessary Syncronization of Java", OOPSLA '99, pp. 20–34, USA.

John Whaley, et al., "Compositional Pointer and Escape Analysis for Java Programs", Laboratory for Computer Science, Massachusetts Institute fo Technology, Cambridge, MA, 1999, pp. 1–20.

Maryam Emami, et al., Context–Sensitive Interprocedural Points–to Analysis in the Presence of Function Pointers, SIGPLAN 1994, Conf. On Programming Language Design and Implementation, pp. 242–256, USA.

* cited by examiner

*Primary Examiner*—Diane D. Mizrahi
(74) *Attorney, Agent, or Firm*—Darby & Darby

(57) ABSTRACT

A computer implemented technique for the static evaluation of the lifetime of objects allocated in memory is presented, which find application in reducing the overhead of generational garbage collection. The method combines pointer alias analysis with static object size determination, from which accurate generational assignment of newly created objects can be accomplished.

46 Claims, 5 Drawing Sheets

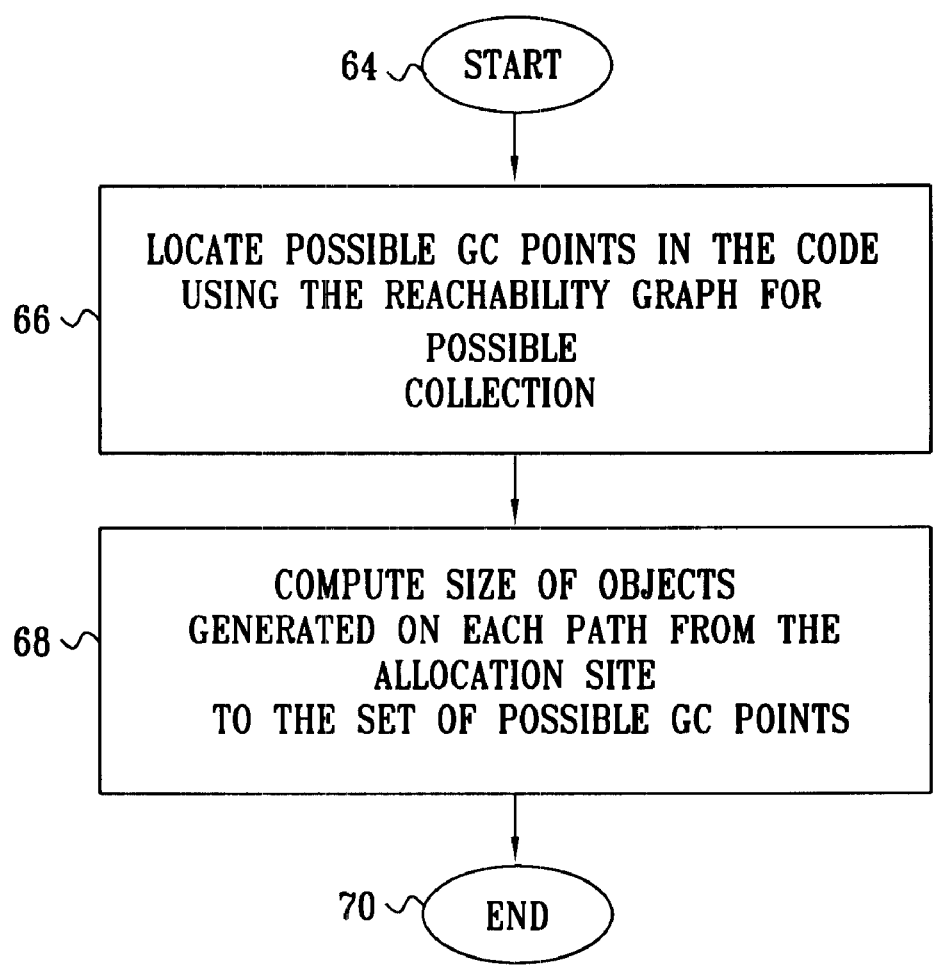

ESTIMATION OF OBJECT LIFETIME USING STATIC ANALYSIS

BACKGROUND OF THE INVENTION

1. Field of the Invention

This invention relates to computational methods. More particularly this invention relates to the static analysis of the lifetimes of heap-allocated objects in functioning computer programs and the application of this analysis to generational garbage collection of heap memory.

2. Description of the Related Art

Current generational schemes of garbage collection allocate newly created objects on the heap to the youngest generation. If such an object survives a certain number of collections of that generation, it is promoted to an older generation. Older generations are collected less often. Promotion overhead continues to be paid until the object is either collected or it resides in the oldest generation. Generational garbage collection can be combined with various collection schemes, e.g., copying collection, mark-sweep collection, and the amount of overhead depends on the specific scheme.

For example, the primary overhead for a copying generational garbage collection, is the repeated copying of the object until it reaches the oldest generation.

In previous work, profiling of information has been proposed to estimate object lifetime. That estimation has then been used dynamically during the course of collection cycles to choose the proper generation in which to allocate the object. This scheme has been shown to indeed avoid the overhead associated with allocating a long-lived object in the youngest generation and then promoting it to an older generation. But this technique has significant drawbacks and incurs considerable runtime overhead. Profiling involves program instrumentation in order to train executions of a program, and further requires collecting and storing the results for later use. Such a process slows down the execution time, sometime by two order of magnitude, and is impractical for large programs. In addition, the results depends on the training input set.

The document *Generational Stack Collection and Profile-Driven Pretenuring,* P. Cheng, R. Harper, and P. Lee, PLDI '98 pp. 162–173. proposes to use profiling to find object lifetimes and employ that information in order to improve a copying generational garbage collector. It discloses an average decrease of 30% in generational garbage collection time, through the avoidance of copying of data from generation to generation. It was noted that a few allocation sites consistently produce data that survive many allocations.

Recently the document *A Study of the Allocation Behavior of the SPECjvm98 Java Benchmarks,* S. Dieckmann, and Urs Holzle, Proceedings of the 13th European Conference on Object-Oriented Programming (ECOOP' 99), Lisbon, June 1999, Springer Verlag, reports that 1%–40% of SPECjvm98 objects are still live after 100 Kbytes, with jess having the lower range and db on the upper end. Even after one megabyte of allocations, 21% of all allocated bytes are still live in javac, 12% in db and 8% in jack. These graphs show a flat age distribution after a drop at about 50 kbytes lasting until the end of the application. The possibility of eliminating expensive copying of large objects makes knowledge of object lifetime especially beneficial.

In other approaches attempts have been made to increase the efficiency of data flow analysis. Data flow analysis computes information about the potential behavior of a program in terms of the definitions and uses of data objects. Such data flow information is important for optimizing compilers, program environments, and understanding tools. It can also be used in a software-testing system or to provide compiler and runtime support for the parallel execution of programs originally written in sequential languages.

Numerous techniques have been successfully developed for data flow analysis of programs written in languages with only static data structures, such as Fortran. However, data flow analysis for programs written in languages with dynamically allocated data structures, such as C, C++, Fortran 90, Java (TM), and LISP, is more challenging because of pointer-induced aliasing, which occurs when two or more pointer expressions refer to the same storage location.

Aliasing occurs when there exists more than one access path to a storage location. An access path is constructed from variables, pointer dereference operators, and structure field selection operators. In C such an expression would include a variable with a possibly empty sequence of the following operators: "*" (dereference), "." (field selection), and "→" (dereference and field selection). For purposes of pointer alias analysis, two access paths are "must-aliases" at a statement S if they refer to the same storage location in all execution instances of S. Two access paths are "may-aliases" at S if they refer to the same storage location in some execution instances of S.

A number of factors are known to influence the cost and precision of practical pointer alias analysis, including the use of flow sensitivity techniques, the use of context sensitivity, the manner in which aggregate data objects such as arrays and classes are modeled, the modeling of the heap, and the choice of alias representation. It is known that there is no general solution to the problem of pointer alias analysis, and the art has therefore attempted to improve the efficiency of the analysis using a variety of empirical and theoretical techniques and combinations. The document, *Interprocedural Pointer Alias Analysis,* Hind, Michael et al., ACM Transactions on Programming Languages, Vol. 21, No. 4, July 1999, proposes one combined approach to the analysis of pointer aliasing.

Pointer analysis has been found to be useful in understanding potential reachability connections between objects or references to objects. Recently, there has been a fair amount of work in developing algorithms for escape analysis of objects in Java (TM) programs to determine whether objects are local to the methods where they are created. Escape analysis is a static analysis that determines whether the object is still alive after the call to the method or procedure that created the object. The importance of escape analysis can be appreciated with reference to object oriented languages such as C++ and Java (TM), as their implementations often employ a garbage collector to assist in memory management. Java (TM) in particular relies on a garbage collector for heap-allocated objects. However garbage collectors are notoriously slow. Stack allocation of objects is one way to minimize garbage collection. It is an object of escape analysis to determine which objects can be stack allocated. A further use of escape analysis is to determine if an object is accessed only by a single thread during its lifetime in order to avoid unnecessary synchronization operations in a multithreaded or multiprocessor environment. A representative publication dealing with escape analysis is the document Escape Analysis for Object Oriented Languages. Application to Java (TM), Blanchet; B., OOPSLA 99.

The following two papers present various techniques that statically analyze objects in Java programs to determine whether they are local to the methods where they are created. These algorithms suggest various mapping techniques in applying escape analysis to reachability problems.

The document *Escape Analysis for Java*, J. D. Choi, M. Gupta, M. Serrano, V. O. Sreedhar, and S. Midkiff, OOPSLA '99, pp. 1–19. reports that reachability and escape analysis specifies over 70% of all dynamically created objects as objects that may be allocated on the stack in three out of the ten benchmarks.

The document *Removing Unnecessary Synchronization in Java*, J. Bogda, and U. Holzle, OOPSLA '99, pp. 20–34 discloses a static evaluation of escape analysis. The authors determined the percentage of candidate alias sets that were optimized. An ideal analysis, having no loss of precision, would reach 100% for a single threaded application. For the programs in their benchmark suite (compress, db, jack, javac, jess, mpegaudio, mtrt from SPECJvm98 in addition to sort and javaCup), the analysis was found to optimize between 91% and 96% of candidate alias sets.

Interprocedural data flow analyses make use of the program call graph (PCG), which is a flow multigraph in which each procedure is represented by a single node and in which an edge represents a potential call of a procedure from a call site of another procedure. In the presence of function pointers or virtual methods a call site may contribute multiple edges to different procedures.

There are many known methods for representing and computing interprocedural aliases for a program written in a language that includes pointers. Basically, during an interprocedural iteration, each procedure is visited, and intermediate intraprocedural information for the procedure is computed. This information is then used to update corresponding interprocedural information.

SUMMARY OF THE INVENTION

Preferred embodiments of the present invention teach an improved technique of data flow analysis using pointer analysis, which can be applied to improve the performance of generational garbage collection of heap memory.

The invention provides a computer implemented method of data flow analysis. An executing computer program employs pointers. Objects are allocated in memory by the program, and the objects are referenced by the pointers. Sizes of the objects are statically calculated at allocation sites in the program. A pointer alias analysis of the program is performed in order to estimate object lifetimes, wherein the estimated object lifetimes do not exceed actual lifetimes of the respective objects. Responsive to the pointer alias analysis and the static size calculation, the objects are assigned, or promoted, to an old generation or, in general, to any of an arbitrary number of generations which vary in age.

Pointer analysis has been the focus of many research works in the last couple of years, and there are many practical methods for representing and computing interprocedural aliases for a program written in a language that includes pointers. Most implementations adopt an "upperbound" approach for representing points-to information: They address all possible reachability connections that may happen in execution instances. This is done in order to ensure safety usage of the pointer analysis results.

In the context of this disclosure, there is no question of safety. There is only time-space tradeoff. At one extreme, in some embodiments the analysis is used very conservatively, in the sense that for every possible object that may be allocated during runtime, the statically estimated lifetime never exceeds the actual lifetime. In other words, a lower bound on the actual object lifetime is being sought. Such lower bound estimations might be too conservative and can result in insufficient reduction in the garbage collection overhead. At the other end, in other embodiments it may be chosen to promote an object to an older generation when the statically-estimated lifetime is computed as an upper bound, i.e. there is a computation path for which the estimated lifetime is correct.

Certain heuristics are adopted in order to control the various approaches. Lower bound, upper bound and "middle" estimations are handled by the heuristics. Using static branch predictor and the generation of "middle" estimations are suggested to give even better results.

An advantage of some aspects of the invention is the improved estimation of object lifetimes. It is known that the age distribution of objects exceeding about 50 kb is nearly flat. This, and the fact that more copying of such large objects takes place are further reasons to be aware of object lifetimes.

The application of some aspects of the invention result in a significant improvement in the static analysis of object lifetime to reduce garbage collection overhead.

These and other advantages of the present invention are attained by a technique for efficiently identifying objects that will persist for long periods of time. In an environment in which generational garbage collection is employed, exploitation of the knowledge of object lifetimes reduces the cost of repeatedly promoting the objects to older generations.

According to an aspect of the invention, the pointer alias analysis includes flow-sensitive analysis.

According to an additional aspect of the invention, an alias graph is iteratively constructed during the step of performing the pointer alias analysis until the alias graph is stable.

According to a further aspect of the invention, the alias graph is constructed by constructing a control flow graph for each analyzable element of the program. A hierarchy graph and a call graph are constructed for each analyzed code segment to determine the caller-callee relationships in the program. At each point in the code, a reachability graph is constructed for representing references to objects created at allocation sites.

According to yet another aspect of the invention, assignment is performed by locating possible garbage collection points in the code using the reachability graph. Paths are identified which extend from the allocation sites to the possible garbage collection points. The sizes of the objects are summed over the paths, and the objects are assigned to appropriate generations responsive to the summed sizes.

In another aspect of the invention, the step of assigning the objects to generations is performed by calculating a space that is allocated by each basic block of the program. The space for each block is accumulated and propagated, using in/out equations, and the objects are assigned responsive to the propagated accumulated space.

Preferably, the step of calculating sizes further includes the step of detecting dynamic loading of a class or, alternatively or additionally, detecting dynamic instantiation of an object, or detecting dynamic invocation of a method.

The pointer alias analysis may include either measuring a lower bound value of an object lifetime, measuring an upper bound value of an object lifetime, or measuring a value of an object lifetime that is intermediate an upper bound value thereof and a lower bound value thereof.

Although in preferred embodiments of the present invention, the methods of analysis described herein are used in promoting one or more of the objects to an older generation for purposes of garbage collection, the principles of the present invention may also be used to group the objects for other purposes.

The invention also provides a method of data flow analysis, including the steps of executing a program on a computer, determining a first point in the program that includes an allocation site of an object that is allocated on a heap memory, statically determining a second point in the program at which a given reachability criterion is satisfied with respect to the object, and statically computing the total amount of heap memory allocated on a path between the first point and the second point.

Preferably, the reachability criterion specifies that there is no reachable connection to the object at the second point. Alternatively, the reachability criterion specifies a heuristic likelihood of existence of a reachable connection to the object at the second point.

Responsive to the total amount of the heap memory, the object is assigned to one of a first group and a second group. In some embodiments there may be many groups to which the object can be assigned.

According to another aspect of the invention, the step of determining the second point is performed by pointer analysis. The pointer analysis includes the steps of constructing a control flow graph for an analyzable element of the program. constructing a hierarchy graph for each analyzable element, and constructing a call graph for the analyzable elements. Responsive to the control flow graph, the hierarchy graph and the call graph, a reachability graph is constructed for the analyzable elements.

According to a further aspect of the invention, static computation of object size is terminated when a computed lifetime exceeds a predetermined value.

According to an aspect of the invention, the step of statically determining a path to the second point is performed by identifying loops in the program that contain instructions for allocating the heap memory, and estimating a lower bound on a number of iterations traversed in the loops.

According to another aspect of the invention, the step of statically determining the second point is performed by predicting at least one frequently taken branch in the program, wherein the computation of the total amount of the heap memory is limited to the least frequently taken branch.

The methods according to the invention can be realized in a computer software product and executed on a general purpose computer with the computer software product resident therein.

BRIEF DESCRIPTION OF THE DRAWING

For a better understanding of these and other objects of the present invention, reference is made to the detailed description of the invention, by way of example, which is to be read in conjunction with the following drawings, wherein:

FIG. 9 is a flow chart illustrating a technique for the static estimation of object lifetime.

DESCRIPTION OF THE PREFERRED EMBODIMENT

In the following description, numerous specific details are set forth in order to provide a thorough understanding of the present invention. It will be apparent however, to one skilled in the art that the present invention may be practiced without these specific details. In other instances well known, control logic, and the details of computer program instructions for conventional algorithms and processes have not been shown in detail in order not to unnecessarily obscure the present invention.

As used herein, object lifetimes are measured by the number of bytes allocated on the heap, as is customary in the art of garbage collection. This is a practical metric because the number of allocated bytes correlates with the amount of work that must be invested by the allocator and by the garbage collector.

Figure 1:
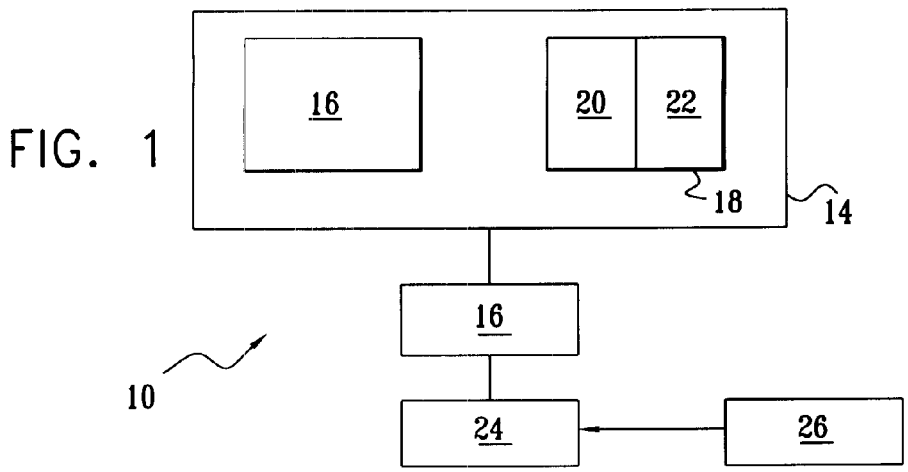
FIG. 1 is a block diagram of a computer suitable for use in practicing the present invention.

Turning now to the drawings and in particular to FIG. 1 there is shown a block diagram of a computer system 10. The system includes a conventional computer 12, in which a memory 14 comprises a program section 16 that stores operating system programs, executing application programs and various runtime support modules for the programs as are known to the art. The memory 14 also includes a data section 18 which stores various data objects that may be generated by the executing programs. The data section 18 is allocated into a stack 20 and a heap 22. While the memory 14 is shown as a single memory for clarity, many variations in its organization and physical type are possible. For example there may be a plurality of stacks. The various components of the memory 14 may also be physically separate according to the architecture of the particular computer 12. The computer 12 is provided with a peripheral device 24 which accepts computer software products. A computer language 26, or runtime support therefor, may be installed in the computer 12 via the peripheral device 24. According to a preferred embodiment of the invention, the computer language 26 employs heap allocation of data objects and utilizes generational garbage collection. The computer language 26 is preferably Java (TM) or a modification thereof, but can be any language that utilizes pointers and heap allocation of data objects. The computer language 26 manages the heap 22 using a generational garbage collection algorithm.

As a program executes in the computer system 10 objects are allocated on the heap 22 and references are defined elsewhere in the memory 14 to point to them. An object is considered to be "alive" as long as it is reachable from some runtime data area via a chain of references. The purpose of a garbage collector is to reclaim unreachable objects in heap memory. Generational garbage collection is based on the observation that heap-allocated objects are typically short-lived. Thus, garbage collection will be more efficient if efforts are concentrated on the most recently allocated, or youngest objects. Objects in the heap are grouped according to age, such that younger groups can be collected more frequently and older groups less often. By estimating object lifetime, it is possible to reduce the overhead of allocating a long-lived object to the youngest generation, and then promoting it to an older generation. According to the preferred embodiment of the invention, this is accomplished through static program analysis. The technique for statically estimating the object lifetime combines two major components:

1. The use of pointer analysis to manipulate potential reachability connections between objects or references to objects. The results of this analysis will be used to detect points in the program where there may be no more references pointing to a particular object. In other words, the event that an object may possibly have ceased to be alive is statically identified. These points are referred to herein as possible garbage collection points.

2. Static calculation of the size of an object being created at some allocation site. When, as in Java, the definition of objects is fully typed, it is possible to statically calculate the size of objects being created at their allocation sites. In Java, the case of allocating an array is an exception, as the number of the array components is not always known statically. As mentioned above, pointer analysis has been the focus of many recent research works, and there are many known methods for representing and computing interprocedural aliases for a program written in a language that includes pointers. All implementations known to the inventors adopt an "upper-bound" approach for representing points-to information. In other words prior art implementations address all possible reachability connections that may happen in execution instances. This is done in order to ensure the safe usage of the pointer analysis results.

In applying the invention, there is a time-space tradeoff. At one extreme, we may use the analysis very conservatively in the sense that for every possible object that may be allocated during runtime, the statically-estimated lifetime never exceeds the actual lifetime. In other words, the analysis attempts to determine a lower bound on the actual object lifetime. Such lower bound estimations might be too conservative and could result in insufficient reduction in the garbage collection overhead. At the other extreme, we can choose to promote an object to an older generation whenever there is any computation path for which the statically estimated object lifetime is correct. This is what is meant by an upper bound on the actual object lifetime.

Certain heuristics have been adopted in order to control the parameters of the analysis within the time-space tradeoff spectrum. In a preferred embodiment it is possible to produce both lower bound, upper bound and intermediate estimations. In some preferred embodiments the use of static branch prediction, followed by the generation of the intermediate estimates may be advantageous.

Pointer alias analysis is assisted by a graph notation. In the reachability graphs shown in FIGS. 2-3, the oval nodes 28 represent objects or references to objects. Rectangular nodes 30 represent variables or instance fields, and the edges 32 represent reachability connections between any of the objects, references to objects, variables and instance fields.

Figure 4:
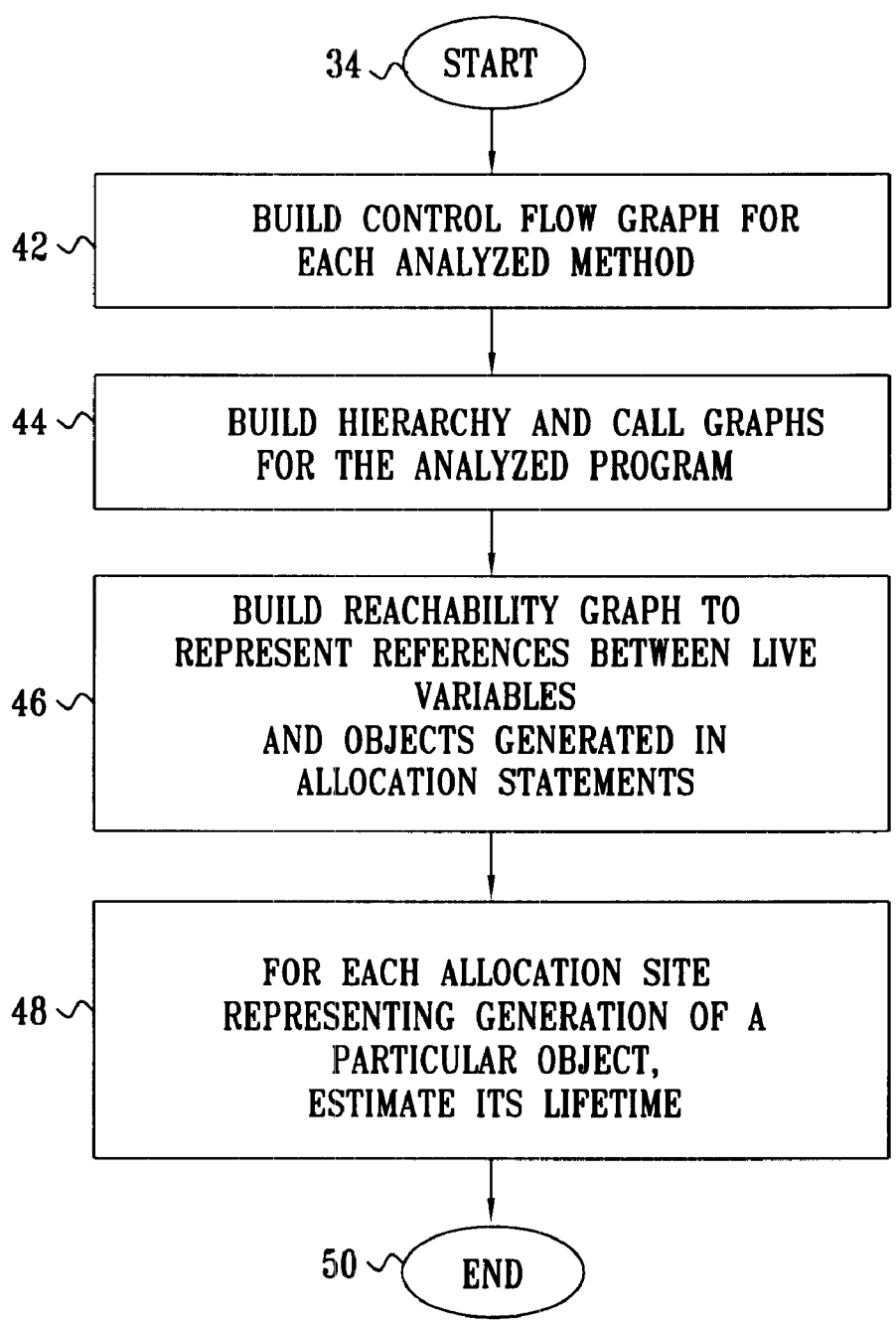
FIG. 4 is a high level flow chart illustrating a method for estimating object lifetimes according to the invention.

The algorithm for object lifetime estimation is disclosed with reference to FIG. 4. At step 34 a program is accepted, for example the program shown in Listing 1. This program is represented graphically by FIG. 5.

Listing 1

```
void static main( . . . ) {
//Begin block 36 (FIG. 5)
    T hop=new T1( . . . );
    T tmp=hop;
    tmp.data1=5;
//End block 36
//Point in code corresponding to the reachability
//graph of FIG. 2
//Begin block 38
    for (int i=0; i<10; i++) {
        T1 pop=new T( . . . );
        T1 z=pop;
        z.foo();
        . . .
//Point in code corresponding to the reachability
//graph of FIG. 6
        pop=null;
        z=null;
    }
//End block 38
//Point in code corresponding to the reachability
//graph of FIG. 3
//Begin block 40
    z=hop;
    tmp=pop;
//End block 40
}
class T extends T1 {
    int data;
    void foo() { . . . }
}
class T1 {
    int data1;
    void foo() { . . . }
}
```

At step 42 a control flow graph is constructed for each analyzable element, such as method, function, procedure or the like, of the code being analyzed, according to the specification of the particular computer language being evaluated. The control flow graphs are used to facilitate intra-procedural reachability analysis, and intra-procedural size computation. Next, at step 44, hierarchy and call graphs are built for the analyzed code.

Figure 2:
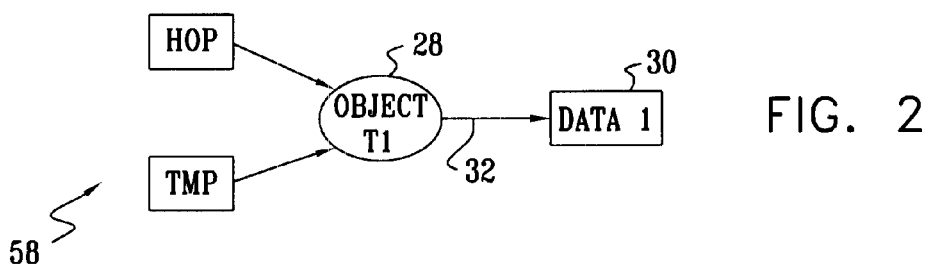
FIGS. 2 and 3 are exemplary reachability graphs.
Figure 3:
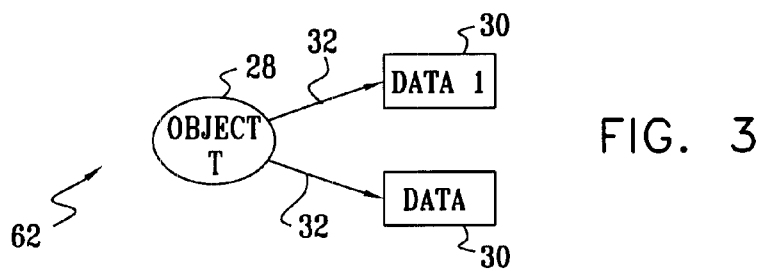

Then at step 46, a reachability analysis is performed for each instruction in the program, as well as at the entrance to and exit from each basic block. Reachability graphs are thus built to represent the references between live variables and objects generated at the allocation sites. Such graphs are shown in FIGS. 2-3. As mentioned above, these reachability graphs differs from conventional reachability graphs that represent an upper bound view.

At step 48 for each allocation site representing the generation of a particular object, the lifetime of the object is statically estimated, as described in detail hereinbelow. The algorithm then terminates at step 50.

Figure 5:
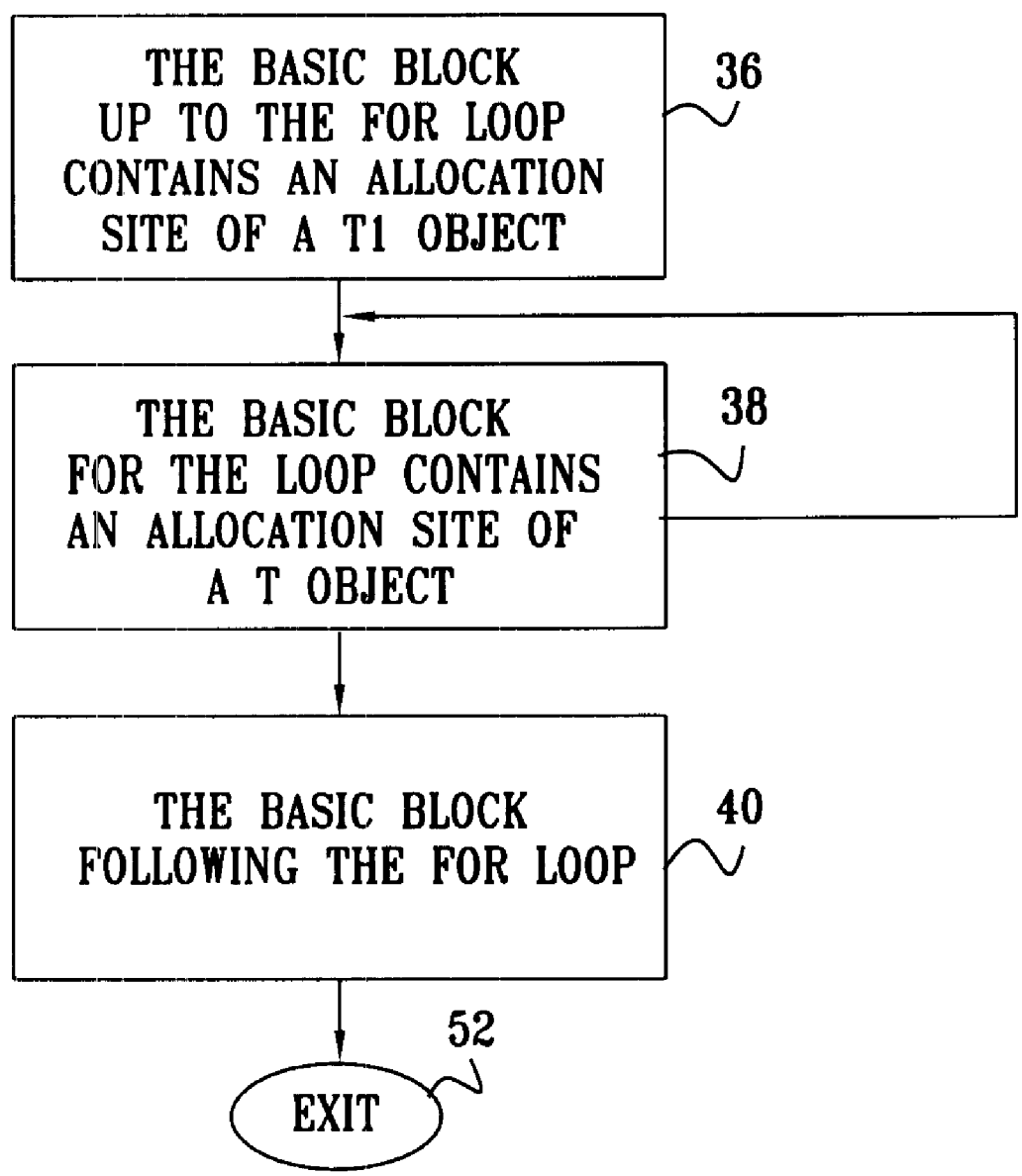
FIG. 5 is an exemplary program flow graph according to the method illustrated in FIG. 4.

The construction of the control flow graph at step 42 is explained in further detail with reference to FIG. 5 and Listing 1. FIG. 5 shows the development of the control flow graph of T.main(). At block 36 a T1 object is allocated prior to reaching the for loop in T.main(). An allocation site for a T object is found within the for loop of T.main(), as indicated at block 38. The basic block following the for loop is indicated by block 40, and the control flow graph is complete at block 52.

Referring to FIGS. 4, 5, 7, 8 and Listing 1, the preparation of the hierarchy graph and the call graph of the program at step 44 are shown. The hierarchy graph 54 provides information on the overriding relationships which is needed in order to build the program call graph 56. The hierarchy graph 54 also provides information on inheritance relationships in order to compute object size at each allocation site. The call graph 56 is used for interprocedural reachability analysis and interprocedural size computation.

Figure 6:
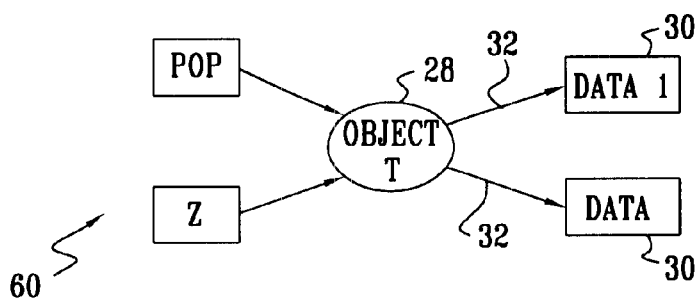
FIG. 6 is an exemplary reachability graph.
Figure 7:
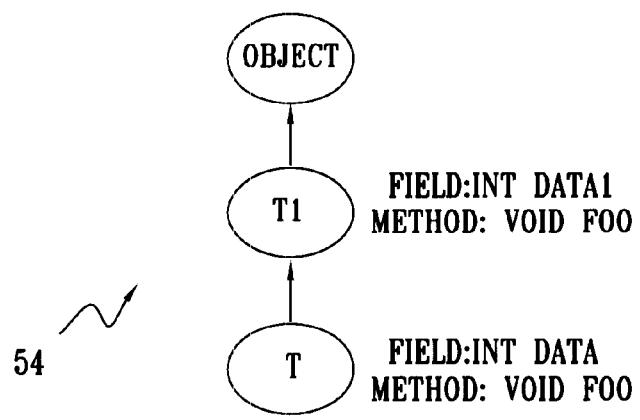
FIG. 7 is an exemplary program hierarchy graph, used in the performance of the method depicted in FIG. 4.
Figure 8:
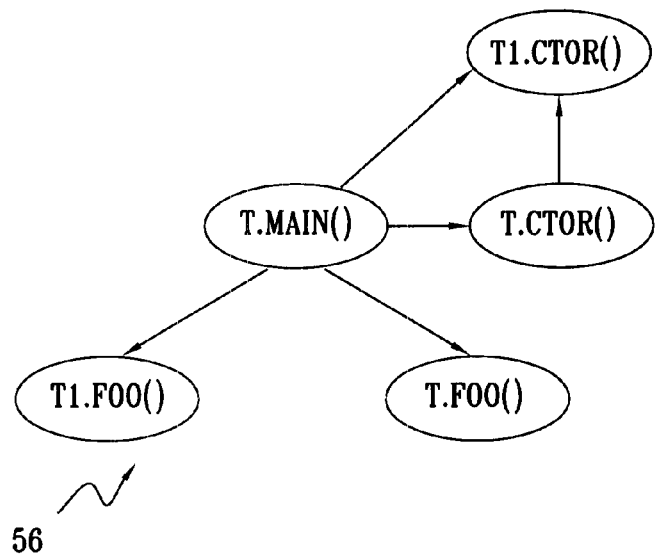
FIG. 8 is an exemplary program call graph according to the method illustrated in FIG. 4.

With reference to FIGS. 2–6 and Listing 1, the construction of the reachability graphs of step 46 is explained in further detail FIG. 2 shows a reachability graph 58 which applies at the conclusion of block 36. FIG. 6 shows a reachability graph 60 which applies while the program is executing in block 38. FIG. 3 shows a reachability graph 62 which applies at the conclusion of block 38.

The reachability graphs 58, 60, 62 graphs model reachability relationships, i.e., the paths from variables to objects, and vice versa. These graphs have similarities to other known pointer reference graphs, such as alias graphs, points-to graphs and connection graphs. Nevertheless, they differ from traditional graphs that represent an upper bound view. As mentioned above, it is intended to capture lower bound views as well as upper bound views. Conventionally reference graphs represent reachability relations that could possibly occur. In contrast, in the potential lower bound view, the graph, generated at a given point in the code, has an edge between nodes, only if we are absolutely sure that there is a reachability relation between those references or objects at the given point. In this case, the reachability graphs 58, 60, 62 are used to locate the earliest point at which there may be no live reference to an object. Thus, for each object node, the pointer alias analysis identifies some program point for which in the corresponding graph there would be no reference pointing to that object node. This program point is used to approximate a lower bound on the lifetime of objects.

Referring now to FIGS. 3, 4, 5, 6, and 9, the method of statically estimating the object lifetime in step 48 is disclosed in further detail. At step 64 the procedure begins. Step 66 represents an analysis according to a preferred embodiment of the invention to locate possible garbage collection points where an object may have no live references pointing to it. In some preferred embodiments both lower bound views as well as upper bound views are captured. In some embodiments the reachability graphs represent reachability relationships that may in fact happen. In other embodiments, in the potential lower bound views, the reachability graph, generated at a given point in the code, has an edge between nodes only if there is certainty that there is a reachability relation between the references or objects at that point.

At step 66 possible garbage collection points are located in the code using the reachability graphs which were constructed at step 46. At each possible garbage collection point an object may have no live references pointing to it, and is not subsequently referenced or used.

At step 68 the paths extending from the allocation sites to the possible garbage collection points are evaluated, and the size of each newly generated object on the paths are calculated. In step 68 in some embodiments the typing characteristics of Java are exploited, wherein it is possible to statically calculate the size of objects being created at allocation sites. Size manipulation is done on the flow graph by calculating the space allocated at each basic block, using some of the information generated by the pointer analyses, and then propagating iteratively the accumulated space with appropriate in/out equations. During interprocedural analysis the allocated size is maintained with each method. The process of FIG. 9 is complete at step 70.

For example, in FIG. 3, at the end of block 38 there are no references to the node representing the objects generated in block 38. In block 40, the lifetime of the object generated in block 36 is measured by its size, given by:

(number of iterations)*(size of $T=2$* size of(int))=20*(size of int), where T is the class shown in Listing 1. There is inevitable imprecision in the static analysis of languages such as Java (TM), which allow late bindings and interpretation. These features can result in actions that cannot be detected statically. Examples of such features are those constructs that enable dynamic loading, instantiation and method invocations. The technique according to the invention attempts to detect all those anomalies. Size manipulation is done on the flow graph by calculating the space allocated at each basic block, using some of the information generated by the pointer analysis and then iteratively propagating the accumulated space with the appropriate in/out equations.

For the interprocedural analysis the allocated size is maintained in association with each method.

There is a time-space trade-off between the safe approach in which the object lifetime is never overestimated, and the unsafe approach, in which overestimation can occur. Overestimation results in a space cost, as space is consumed in maintaining old generations. Under-estimation costs time due to the overhead of manipulating long lived objects by the garbage collector.

There are heuristics which are applied to optimizing the time-space tradeoff:

1. Relaxing the strength of the analysis. This can be implemented by keeping less information during the analysis, or by computing non-lower bound values, or by ignoring some computation paths that are unlikely to be used during successful runs.
2. Selecting the most promising places that generate long lived objects. Static techniques for recognizing such places may include: (i) Searching for loops that contain instructions for allocating heap space and estimating a lower bound on the number of iterations traversed in such loops. (ii) Using branch prediction information to find the most frequently used computation paths. This set of paths can be used for estimating the allocated area and the lifetime of some objects.

Objects that were generated before the entry to "hot spots" are recognized using the second heuristic. They are marked as being old if they will last after the exit from a "heavy" hot spot. It is known that a lifetime of over a few megabytes causes an object to be assigned to an old generation during generational garbage collection. Such information can be exploited to limit the process of determining the size of an object once it is realized that the object exceeds a threshold value.

Dieckmann et al. have reported in their above noted publication that the reference density distribution is relatively high: In spite of this observation they claim that SPECjvm98 programs are good candidates for generational garbage collection, although not as good as the small programs studied earlier. In some preferred embodiments of the invention an additional analysis for recognizing references from the old objects found to other objects in the heap may be added. This will enable a simple inexpensive handling of those references during escape analysis.

We have disclosed herein a technique for the static estimation of object lifetimes, which finds application in the optimization of generational garbage collection. Reduction of garbage collection runtime overhead may be crucial in accepting newer languages such as Java (TM). According to the invention pointer analysis is combined with object size measurement in order to estimate the amount of heap allocated from the time an object is allocated until the time that it is no longer reachable.

While this invention has been explained with reference to the structure disclosed herein, it is not confined to the details set forth and this application is intended to cover any modifications and changes as may come within the scope of the following claims:

What is claimed is:

1. A computer implemented method of data flow analysis comprising the steps of:
    executing a program on a computer, wherein said program employs pointers, and objects are allocated in a memory by said program, said objects being referenced by said pointers;
    statically calculating sizes allocated to said objects at allocation sites in said program;
    performing a pointer alias analysis of said program to estimate object lifetimes, wherein said estimated object lifetimes do not exceed respective actual lifetimes of said objects; and
    responsive to said pointer alias analysis and said step of statically calculating sizes, assigning said objects to one of a first group and a second group.

2. The method according to claim 1, wherein said second group comprises a plurality of groups.

3. The method according to claim 1, wherein said pointer alias analysis comprises flow-sensitive analysis.

4. The method according to claim 1, wherein an alias graph is iteratively constructed during said step of performing said pointer alias analysis until said alias graph is stable.

5. The method according to claim 4, wherein said alias graph is constructed by the steps of:
    constructing a control flow graph for each analyzable element of said program to define an analyzed code segment for each said analyzable element;
    constructing a hierarchy graph and a call graph for each said analyzed code segment to determine caller-callee relationships of said program; and
    at each code point of said program, constructing a reachability graph for respectively representing references to said objects generated at said allocation sites.

6. The method according to claim 5, wherein said step of assigning said objects is performed by:
    locating possible garbage collection points on said reachability graph of each of said allocation sites;
    identifying paths extending from said allocation sites to said possible garbage collection points; and
    summing said sizes of said objects over said paths, wherein said objects are assigned responsive to said summed sizes.

7. The method according to claim 1, wherein said step of assigning said objects is performed by:
    calculating a space that is allocated by each basic block of said program;
    accumulating each said space to define an accumulated space; and
    iteratively propagating said accumulated space using in/out equations, wherein said objects are assigned responsive to said propagated accumulated space.

8. The method according to claim 1, wherein said step of calculating sizes further comprises the step of detecting dynamic loading of a class.

9. The method according to claim 1, wherein said step of calculating sizes further comprises the step of detecting dynamic instantiation of an object.

10. The method according to claim 1, wherein said step of calculating sizes further comprises the step of detecting dynamic invocation of a method.

11. The method according to claim 1, wherein said pointer alias analysis comprises measuring a lower bound value of an object lifetime.

12. The method according to claim 1, wherein said pointer alias analysis comprises measuring an upper bound value of an object lifetime.

13. The method according to claim 1, wherein said pointer alias analysis comprises measuring a value of an object lifetime that is intermediate an upper bound value thereof and a lower bound value thereof.

14. A method according to claim 1, wherein assigning said objects comprises promoting one or more of said objects to an older generation for purposes of garbage collection.

15. A method of data flow analysis, comprising the steps of:
    executing a program on a computer;
    determining a first point in said program that comprises an allocation site of an object that is allocated on a heap memory;
    statically determining a second point in said program satisfying a reachability criterion with respect to said object;
    statically computing a total amount of said heap memory allocated on a path between said first point and said second point;
    responsive to said total amount of said heap memory, assigning said object to one of a first group and a second group.

16. A method according to claim 15, wherein said reachability criterion specifies that there is no reachable connection to said object at said second point.

17. A method according to claim 15, wherein said reachability criterion specifies a heuristic likelihood of existence of a reachable connection to said object at said second point.

18. A method according to claim 15, wherein assigning said object comprises promoting said object to an older generation for purposes of garbage collection.

19. The method according to claim 15, wherein said step of determining said second point is performed by pointer analysis.

20. The method according to claim 19, wherein said pointer analysis comprises the step of:
    constructing a control flow graph for an analyzable element of said program.

21. The method according to claim 20, wherein said pointer analysis further comprises the steps of:
    constructing a hierarchy graph for said analyzable element; and
    constructing a call graph for said analyzable element.

22. The method according to claim 21, wherein said pointer analysis further comprises the step of:
    responsive to said control flow graph, said hierarchy graph and said call graph, constructing a reachability graph for said analyzable element.

23. The method according to claim 15, further comprising the step of:
    terminating said step of statically computing when a computed amount of said heap memory exceeds a predetermined value.

24. The method according to claim 15, wherein said step of assigning comprises assigning said object to a generation.

25. The method according to claim 15, wherein said step of statically determining said second point is performed by:
    identifying loops in said program that contain instructions for allocating said heap memory; and estimating a lower bound on a number of iterations traversed in said loops.

26. The method according to claim 15, wherein said step of statically determining said second point is performed by:
predicting at least one frequently taken branch in said program,
wherein said step of statically computing said total amount of said heap memory is limited to said at least one frequently taken branch.

27. A computer software product, comprising a computer-readable medium in which instructions are stored, which instructions, when read by a computer, cause the computer to perform the steps of:
in an executing program determining a first point in said program that comprises an allocation site of an object that is allocated on a heap memory;
statically determining a second point in said program satisfying a reachability criterion with respect to said object;
statically computing a total amount of said heap memory allocated on a path between said first point and said second point; and
responsive to said total amount of said heap memory, assigning said object to one of a first group and a second group.

28. The computer software product according to claim 27, wherein said step of determining said second point is performed by pointer analysis.

29. The computer software product according to claim 28, wherein said pointer analysis comprises the step of:
constructing a control flow graph for an analyzable element of said program.

30. The computer software product according to claim 29, wherein said pointer analysis further comprises the steps of:
constructing a hierarchy graph for said analyzable element; and
constructing a call graph for said analyzable element.

31. The computer software product according to claim 30, wherein said pointer analysis further comprises the step of:
responsive to said control flow graph, said hierarchy graph and said call graph, constructing a reachability graph for said analyzable element.

32. The computer software product according to claim 27, further causing the computer to perform the step of:
terminating said step of statically computing when a computed amount of said heap memory exceeds a predetermined value.

33. The computer software product according to claim 27, wherein said step of assigning comprises assigning said object to a generation.

34. The computer software product according to claim 27, wherein said step of statically determining said second point is performed by:
identifying a loop in said program that contains instructions for allocating said heap memory; and
estimating a lower bound on a number of iterations traversed in said loop.

35. The computer software product according to claim 27, wherein said step of statically determining said second point is performed by:
predicting at least one frequently taken branch in said program;
wherein said step of statically computing said total amount of said heap memory is limited to said at least one frequently taken branch.

36. The computer software product according to claim 27, wherein said step of assigning said object comprises promoting said object to an older generation for purposes of garbage collection.

37. A computer comprising:
a program memory having instructions stored therein; and
an execution unit that accesses said instructions for execution thereof, wherein said instructions cause said execution unit to perform the steps of:
executing a program;
determining a first point in said program that comprises an allocation site of an object that is allocated on a heap memory;
statically determining a second point in said program satisfying a reachability criterion with respect to said object;
statically computing a total amount of said heap memory allocated on a path between said first point and said second point; and
responsive to said total amount of said heap memory, assigning said object to one of a first group and a second group.

38. The computer according to claim 37, wherein said step of determining said second point is performed by pointer analysis.

39. The computer according to claim 38, wherein said pointer analysis comprises the step of:
constructing a control flow graph for an analyzable element of said program.

40. The computer according to claim 39, wherein said pointer analysis further comprises the steps of:
constructing a hierarchy graph for said analyzable element; and
constructing a call graph for said analyzable element.

41. The computer according to claim 40, wherein said pointer analysis further comprises the step of:
responsive to said control flow graph, said hierarchy graph and said call graph, constructing a reachability graph for said analyzable element.

42. The computer according to claim 37, wherein said execution unit further performs the step of:
terminating said step of statically computing when a computed amount of said heap memory exceeds a predetermined value.

43. The computer according to claim 37, wherein said step of assigning comprises assigning said object to a generation.

44. The computer according to claim 37, wherein said step of statically determining said second point is performed by:
identifying a loop in said program wherein said instructions allocate said heap memory; and
estimating a lower bound on a number of iterations traversed in said loop.

45. The computer according to claim 37, wherein said step of statically determining said second point is performed by:
predicting at least one frequently taken branch in said program,
wherein said step of statically computing said total amount of said heap memory is limited to said at least one frequently taken branch.

46. The computer according to claim 37, wherein said step of assigning said object comprises promoting said object to an older generation for purposes of garbage collection.

* * * * *